(12) United States Patent
Mortimer et al.

(10) Patent No.: US 9,695,312 B2
(45) Date of Patent: Jul. 4, 2017

(54) RESIN COMPOSITION AND COMPOSITE STRUCTURE CONTAINING RESIN

(71) Applicant: Hexcel Composites Limited, Cambridge (GB)

(72) Inventors: Stephen Mortimer, St. Ives (GB); Scott Stevens, Impington (GB)

(73) Assignee: Hexcel Composites Limited, Duxford (GB)

( * ) Notice: Subject to any disclaimer, the term of this patent is extended or adjusted under 35 U.S.C. 154(b) by 41 days.

(21) Appl. No.: 14/422,721

(22) PCT Filed: Sep. 25, 2013

(86) PCT No.: PCT/EP2013/070024
§ 371 (c)(1),
(2) Date: Feb. 20, 2015

(87) PCT Pub. No.: WO2014/049028
PCT Pub. Date: Apr. 3, 2014

(65) Prior Publication Data
US 2015/0210847 A1    Jul. 30, 2015

(30) Foreign Application Priority Data

Sep. 26, 2012 (GB) .................. 1217226.8
Jul. 12, 2013 (GB) .................. 1312508.3

(51) Int. Cl.
| | |
|---|---|
| C08L 63/00 | (2006.01) |
| C08L 33/04 | (2006.01) |
| C08G 59/20 | (2006.01) |
| C08G 59/24 | (2006.01) |
| C08G 59/50 | (2006.01) |
| C08G 59/40 | (2006.01) |
| C08J 5/24 | (2006.01) |
| C08L 67/00 | (2006.01) |
| C08L 79/04 | (2006.01) |
| C08L 79/08 | (2006.01) |

(52) U.S. Cl.
CPC ............ *C08L 63/00* (2013.01); *C08G 59/245* (2013.01); *C08G 59/504* (2013.01); *C08G 59/5033* (2013.01); *C08J 5/24* (2013.01); *C08L 33/04* (2013.01); *C08L 67/00* (2013.01); *C08L 79/04* (2013.01); *C08L 79/08* (2013.01); *C08L 2205/025* (2013.01); *C08L 2205/03* (2013.01)

(58) Field of Classification Search
CPC .......... C08L 63/00–63/10; C08L 33/04; C09D 163/00–163/10; C09J 163/00–163/10; C08G 59/22; C08G 59/24; C08G 59/25; C08G 59/50; C08G 59/504; C08G 59/5033; C08G 59/245; C08J 5/24
See application file for complete search history.

(56) References Cited

U.S. PATENT DOCUMENTS

| | | | |
|---|---|---|---|
| 4,684,678 A | 8/1987 | Schultz et al. | |
| 4,882,330 A | 11/1989 | Walsh et al. | |
| 4,882,370 A | 11/1989 | Jordan et al. | |
| 5,302,672 A | 4/1994 | Ogura et al. | |
| 5,360,837 A | 11/1994 | Honda et al. | |
| 5,369,192 A | 11/1994 | Ko et al. | |
| 6,063,839 A | 5/2000 | Oosedo et al. | |
| 2007/0106036 A1 | 5/2007 | Asano et al. | |
| 2010/0222461 A1* | 9/2010 | Bongiovanni | C08G 59/56 524/35 |
| 2011/0049426 A1 | 3/2011 | Patel et al. | |

FOREIGN PATENT DOCUMENTS

| | | |
|---|---|---|
| EP | 2628827 | 8/2013 |
| JP | H09137044 | 5/1997 |
| JP | 3631543 | 3/2005 |
| WO | 95/05411 | 2/1995 |
| WO | 2009/138749 | 11/2009 |

OTHER PUBLICATIONS

BSI Group, BS EN 6032:2015 web page, http://shop.bsigroup.com/ProductDetail/?pid=000000000030282948 (retrieved Nov. 15, 2016).*
BSI Group, BS EN 6038:2015 web page, http://shop.bsigroup.com/ProductDetail/?pid=000000000030298661 (retrieved Nov. 15, 2016.*
JP3631543—Mar. 23, 2005—Mitsubishi Rayon—English Translation.

* cited by examiner

*Primary Examiner* — Kregg Brooks
(74) *Attorney, Agent, or Firm* — W. Mark Bielawski; David J. Oldenkamp

(57) ABSTRACT

A resin composition for producing a composite part, comprising a first resin component comprising a glycidyl ether epoxy resin, a second resin component comprising a naphthalene based epoxy resin, and an amino-phenyl fluorene curative; wherein the epoxy resin components a) and b) contain up to 33 wt % of the second resin component.

6 Claims, No Drawings

RESIN COMPOSITION AND COMPOSITE STRUCTURE CONTAINING RESIN

The present invention relates to a resin composition and a composite structure, particularly but not exclusively to a resin composition for resin infusion moulding.

BACKGROUND

EP 2276808 discloses the use of a naphthalene diepoxy resin in a composition to impart a glass transition temperature ($T_g$) of greater than 150° C. More than 35 wt % of the epoxy components in the composition are naphthalene diepoxy resins.

JP3631543 also discloses the use of a naphthalene diepoxy resin in a composition to impart a high glass transition temperature ($T_g$), whereby 33 to 71 wt % of the epoxy components in the composition are naphthalene diepoxy resins.

None of the aforesaid resins are however suitable for resin infusion moulding to produce composite parts which have the desired high wet $T_g$ of at least 130° C. in combination with excellent mechanical properties, including a high toughness and compression after impact (CAI) strength; whilst also providing a suitably long processing window to enable the manufacture of large composite parts.

The present invention aims to obviate or at least mitigate the above described problems and/or to provide improvements generally.

SUMMARY OF THE INVENTION

According to the invention, there is provided a composition, a resin system and a use as defined in any one of the accompanying claims.

In an embodiment, there is provided a resin composition for producing a composite part, comprising a first resin component comprising a glycidyl ether epoxy resin (a), a second resin component comprising a naphthalene based epoxy resin (b), an amino-phenyl fluorene curative (c), and wherein the epoxy resin components a) and b) contain up to 33 wt % of the second resin component.

In an embodiment of the invention, the epoxy resin components a) and b) contain between 5 to 33 wt % of the second resin component, preferably from 7 to 32.5 wt % of the second resin component, more preferably from 12 to 32 wt % of the second resin component, and even more preferably from 19 to 32 wt % of the second resin component, most preferably from 20 up to but not including 33 wt % of the second resin component, and/or combinations of the aforesaid ranges.

This composition has the important advantage of providing a desired high wet $T_g$ of at least 130° C. in combination with excellent mechanical properties, including a high toughness and compression after impact (CAI) strength; whilst also providing a suitably long processing window to enable the manufacture of large composite parts.

In an embodiment, the resin composition has a wet $T_g$ of at least 130° C., preferably, at least 140° C., and more preferably of at least 150° C. when cured at 190° C. for 120 mins. Dry and wet $T_g$ are measured in accordance with ASTM D7028 by dynamic mechanical analysis (DMA). Wet testing was performed on samples after a two-week immersion in water at a temperature of 70° C.

In a further embodiment of the invention one or more of the mechanical properties of the neat resin composition are as follows:

a critical strain energy release rate $G_{Ic}$ in the range of from 500 to 1000 J/m², preferably from 700 to 1000 J/m² as measured in accordance with ASTM D5045 - 99(2007) e1 and/or combinations of the aforesaid ranges;

critical-stress-intensity factor, $K_{Ic}$ in the range of from 1.0 to 2.5 MPa$^{0.5}$, preferably from 1.4 to 2.0 MPa$^{0.5}$ or from 1.6 to 2.0 MPa$^{0.5}$ as measured in accordance with ASTM D5045-99(2007)e1 and/or combinations of the aforesaid ranges;

a modulus G in the range 3.0 to 3.8, preferably in the range of from 3.2 to 3.6, or from 3.0 to 3.8 or from 3.3 to 3.5 and/or combinations of the aforesaid ranges as measured in accordance with ASTM D 790;

the $T_g$ onset (dry) is in the range of from 130 to 220° C., or from 150 to 200° C., or preferably from 170° C. to 190° C. and/or combinations of the aforesaid ranges;

the $T_g$ onset (wet) is in the range of from 100 to 180° C., or from 120 to 170° C., preferably from 130° C. to 160° C. or from 125 to 145° C. and/or combinations of the aforesaid ranges;

SPECIFIC DESCRIPTION

In an embodiment there is provided a resin composition which is suitable for resin infusion processes. In these processes, a lay-up is made from dry fibrous reinforcement material which is subsequently infused with a resin.

The resin composition of the invention may comprise a first resin component comprising a glycidyl ether epoxy resin (a), a second resin component comprising a naphthalene based epoxy resin (b), an amino-phenyl fluorene curative (c), and wherein the epoxy resin components a) and b) contain up to 33 wt % based on the resin composition of the second resin component.

The curative and the second resin component may be varied to arrive at the desired mechanical performance and $T_g$ properties for the composition.

In one embodiment, the curing agent has general formula I

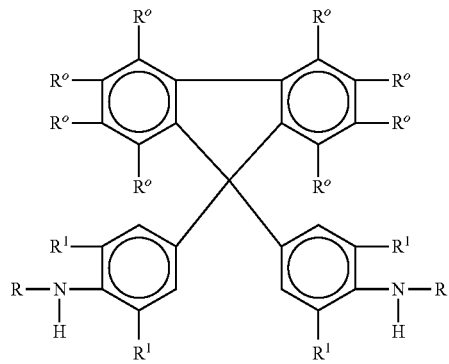

wherein each $R^0$ is independently selected from hydrogen and groups that are inert in the polymerization of epoxide group-containing compounds which are preferably selected from halogen, linear and branched alkyl groups having 1 to 6 carbon atoms, phenyl, nitro, acetyl and trimethylsilyl; each R is independently selected from hydrogen and linear and branched alkyl groups having 1 to 6 carbon atoms; and each $R^1$ is independently selected from R, hydrogen, phenyl, and halogen.

The thermally curable epoxy resin compositions of the invention comprise one or more aromatic polyepoxides which preferably are poly(glycidyl ether)s of polyhydric phenols and one or more 9,9-bis(aminophenyl)fluorenes. The aromatic polyepoxide composition comprises from 0.1 to 1.1 amino groups or from 0.5 to 1.5 amino groups, —NHR, present in the 9,9-bis(aminophenyl)fluorenes, as defined above, per epoxide group of the aromatic polyepoxide and, optionally, a sufficient amount of a conventional epoxy resin curing agent (also called hardener) such as a polyamino group-containing compound and/or a conventional epoxy resin curing catalyst as are well known in the art.

The first resin component may comprise a difunctional epoxy resin. This is an epoxy resins having two epoxy groups on the monomer unit from which the resin is derived. The first component is preferably selected from resins based on diglycidyl ether of Bisphenol F, diglycidyl ether of Bisphenol A, alone or in combination, phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

Most preferred is diglycidyl ether of Bisphenol F. Diglycidyl ether of Bisphenol F is available commercially from Huntsman Advanced Materials under the trade names Araldite GY281 and GY285.

In another embodiment, the epoxy resin may be any suitable epoxy resin. Suitable epoxy resins may include those based on glycidyl epoxy, and non-glycidyl epoxy resins, alone or in combination. It will be understood that glycidyl epoxies are those prepared via a condensation reaction of appropriate dihydroxy compounds, dibasic acid or a diamine and epichlorohydrin. Non-glycidyl epoxies are typically formed by peroxidation of olefinic double bonds. The glycidyl epoxy resins may be further selected from glycidyl-ether, glycidyl-ester and glycidyl-amine based resins. The non-glycidyl epoxy resins may be selected from either aliphatic or cycloaliphatic epoxy resins.

As discussed, glycidyl ether epoxy resins are particularly preferred. Suitable examples of epoxy resin include resins comprising at least one of bisphenol-A (BPA) diglycidyl ether and/or bisphenol-F (BPF) diglycidyl ether and derivatives thereof; tetraglycidyl derivatives of 4,4'-diaminodiphenylmethane (TGDDM); triglycidyl derivatives of aminophenols (TGAP), epoxy novolacs and derivatives thereof, other glycidyl ethers and glycidyl amines well known in the art, or any combination thereof.

In a further embodiment of the invention, the composition comprises poly(glycidyl ethers) of polyhydric phenols, said composition when cured with such secondary amines or mixtures thereof having a high wet glass transition temperature (Tg) of at least 130° C., preferably, at least 140° C., and more preferably of at least 150° C. when cured at 190° C. for 120 mins.

The composition of the invention may comprise further resin components in any suitable amount.

Without wishing to be unduly bound by theory, it has been found that the benefits of the invention may be conferred due to the use of naphthalene based epoxy resins which provide relatively low cross-linked density of the resin system, whilst also having a high Tg of typically greater than 130° C. Typically in order to achieve a resin matrix with a high Tg, the cured resin must be highly crosslinked. This is usually achieved by using a substantial amount of a multifunctional epoxy resin. However, such highly crosslinked resins are very difficult to toughen. The naphthalene epoxy resins provide a lower degree of crosslink density, and therefore toughening is possible. A high Tg is still obtained with this resin system due to the rigidity provided by the naphthalene backbone.

The term 'naphthalene based epoxy resins' refers to epoxy resins having at least one naphthalene ring in its backbone. It will be understood that references to naphthalene based epoxy resins refers to those having a naphthalene ring with at least one epoxy group directly substituted thereupon. The naphthalene ring may comprise more than one epoxy group, with two or three epoxy groups being particularly suitable. The naphthalene based epoxy resins are therefore formed from monomer units comprising a naphthalene ring with at least one epoxy group substituted thereupon.

The naphthalene based epoxy resins may be based on monomer units with more than one epoxy group and therefore di, tri, and tetrafunctional epoxy monomers may be selected in any combination.

Preferably, the monomer units comprise a naphthalene ring with two epoxy groups substituted thereupon, and therefore difunctional epoxy monomers are particularly preferred.

The epoxy groups may be bonded to the naphthalene ring at any suitable position in any suitable combination.

Suitable naphthalene based epoxy resins may include those derived from dihydroxynaphthalene, trihydroxynaphthalene, or terahydroxynaphthalene. Naphthalene based epoxy resins derived from dihydroxynaphthalene are particularly preferred. Specific dihyroxynaphthalene precursors which may be used for producing the naphthalene based epoxy resin, by way of example, include those based on 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 2,3-dihydroxynaphthalene, and 2,7-dihydroxynaphthalene.

Naphthalene based epoxy resins based on 1,6-dihydroxynaphthalene are particularly preferred.

The naphthalene ring may also have non-epoxy substituents bonded at any of the non-epoxy substituted sites. The non-epoxy substituted sites of the naphthalene ring may be substituted with any suitable non-epoxy substituents. Suitable non-epoxy substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. The non epoxy substituent groups may be straight, branched, cyclic, or polycyclic substituents.

The non-epoxy substituents may be the same, or may be independently selected.

The naphthalene based epoxy resins may also be formed from monomer units which comprise more than one naphthalene ring within each monomer unit, and comprise at least one epoxy group directly bonded to at least one of the naphthalene rings.

Preferably, the monomer unit comprises two epoxy groups, wherein both epoxy groups may be bonded to the same naphthalene ring, or each of the epoxy groups may be bonded to different naphthalene rings. In such an embodiment, each naphthalene ring structure may individually comprise one epoxy substituent to give a monomer unit which is difunctional overall. Other suitable examples would be where each naphthalene ring structure comprises two epoxy substituents to provide a monomer unit which is tetrafunctional overall.

Suitable naphthalene based epoxy resins having more than one naphthalene ring in the monomer unit may include those based on dihydroxy dinaphthalene, trihydroxy dinaphthalene, or tetrahydroxy dinaphthalene. Naphthalene based epoxy resins derived from dihydroxynaphthalene or tetrahydroxy dinaphthalene precursors are particularly preferred.

The monomer unit having two or more naphthalene rings would have the naphthalene rings bonded together with a bridging group. Suitable bridging groups include substituted and unsubstituted alkylene groups. Examples of non-substituted alkylene bridging groups include methyl, ethyl, n-propyl, iso-propyl, n-butyl, iso-butyl, tert- butyl, pentyl, pentyl, hexyl, and trimethyl. Examples of substituted alkylene bridging groups include 2,2-dimethyl-trimethylene, 2,2-diethyl-trimethylene, 2,2-dimethyl-tetramethylene, 2-methyl, 2-hydroxymethyl-trimethylene, and 2,2-di-hydroxymethyl-trimethylene.

Suitable naphthalene based epoxy resins having more than one naphthalene ring include those derived from naphthalenylalkyl naphthalene, where the alkyl bridging group may be any of the alkylene bridging groups detailed herein. The epoxy functional groups on the dinaphthalene moiety may be present at any of the suitable binding sites in any combination. The epoxy functional groups may therefore be present at the 2, 3, 4, 5, 6, and 7 binding sites on any of the naphthalene rings present, and where there is more than one epoxy functional group these may be present in any suitable combination on any of the naphthalene rings.

The naphthalene epoxy resins having the epoxy functional groups at the 2 or/and 7 sites on one or both of the naphthalene rings are particularly preferred.

Specific di-naphthalene precursors which may be used for producing the naphthalene based epoxy resin having two naphthalene rings in each unit, by way of example, include those based on I-(2-hydroxy-naphthalen-I-ylmethyp-naphthalene-2-ol, I-(2- ydroxy-naphthalen-1-ylmethyl)-naphthalene-2,7-diol, 1 -(2-hydroxy-naphthalen-1- ylmethyl)-naphthalene-7-ol, 1 -(7-hydroxy-naphthalen-1-ylmethyl)-naphthalene-7-ol, I-(2,7-dihydroxy-naphthalen-I-ylmethyl)-naphthalene-2,7-diol, or any combination thereof.

Particularly preferred precursors for producing the naphthalene based epoxy resin are 1-(2-hydroxy-naphthalen-1-ylmethyl)-naphthalene-2,7-diol, 1-(2-hydroxy-naphthalen-I-ylmethyl)-naphthalene-7-ol, and I-(2,7-dihydroxy-naphthalen-I-ylmethyl)-naphthalene-2,7-diol, or any combination thereof.

These particularly preferred precursors are available commercially as HP4700, HP4750 and HP4770 (available from Danippon Ink & Chemicals of Japan). The chemical structures of these monomer units in epoxy form are shown below for reference.

Any of the above naphthalene based monomer precursors may be formed in to a glycidyl epoxy resin, such as glycidyl ethers epoxy resins. In particular, diglycidyl ethers of the precursors are preferred. The diglycidyl ethers of the precursors may be formed by reacting the precursor with epichlorohydrin in the presence of a basic catalyst.

An example of a preferred naphthalene based epoxy would be diglycidyl ether of 1,6-dihydroxynaphthalene (available commercially as Epiclon HP-4032 and HP-4032D from Dainippon Ink and Chemicals Incorporated of Japan).

In another embodiment, the naphthalene based epoxy resins are present in the epoxy resin in an amount equal to or less than 45 wt % of the epoxy component(s). Preferably, the naphthalene epoxy resins are present in an amount equal to or less than 35 wt % of the epoxy component(s). More preferably, the naphthalene epoxy resins are present in an amount less than 33 wt % of the epoxy component and/or combinations of the aforesaid ranges.

The naphthalene based epoxy resins may be present in the epoxy resin in an amount of greater than 1 wt % of the epoxy component. Preferably, the naphthalene epoxy resins are present in an amount of greater than 5 wt % of the epoxy component. More preferably, the naphthalene epoxy resins are present in an amount of greater than 10 wt % of the epoxy component and/or combinations of the aforesaid ranges. It will be understood that references in the description to amounts of naphthalene based epoxy resins in relation to the epoxy component are expressed as a proportion of the epoxy components which may be present in the resin composition.

Alternatively, the epoxy resin may be copolymerised with any suitable non-epoxy resin. Non-epoxy resins which may be used in either embodiment include, but are not limited to, those described herein.

The non-naphthalene epoxy resins may be present in the epoxy resin in an amount equal to or greater than 1 wt %, or 2 wt % or 5 wt % or 10 wt %. Preferably, in an amount equal to or greater than 15 wt %. More preferably, in an amount equal or greater than 20 wt % and/or combinations of the aforesaid ranges.

The non-naphthalene epoxy resins may present in the epoxy resin in an amount less than or equal to 80 wt %. Preferably, in an amount less than or equal to 65 wt %. More preferably, in an amount less than or equal to 80 wt % and/or combinations of the aforesaid ranges. The resin system may comprise at least one further thermoset resin, wherein the further thermoset resin is not naphthalene based epoxy resins or non-naphthalene epoxy resin as described herein.

A preferred curable epoxy resin composition of the invention comprises: (1) at least one aromatic polyepoxide, which preferably is at least one poly(glycidyl ether) of a polyhydric phenol, and (2) 0.5 to 1.5 —NHR groups (or 0.5 to 1.1 —NHR groups), per epoxide group present in the aromatic polyepoxide, of an amino group-containing epoxy resin curing agent or a mixture of amino group-containing epoxy resin curing agents of which (a) 20 to 100 mole % of the —NHR groups is provided by a 9,9-bis(aminophenyl)fluorene having the formula II

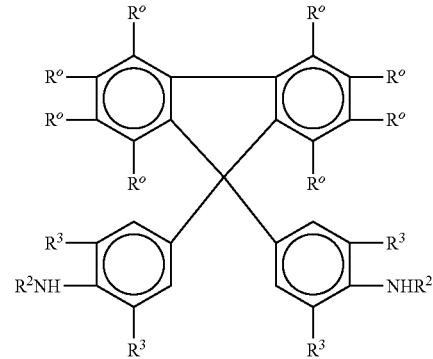

wherein each $R^2$ is independently selected from hydrogen and linear and branched alkyl groups having 1 to 6 carbon atoms of which at least 25 mole % of $R^2$ is linear or branched alkyl, each $R^3$ is independently selected from hydrogen, linear and branched alkyl groups having one to six carbon atoms, phenyl, halogen, and each $R^o$ is as defined for Formula I, and (b) 80 to 0 mole % of an epoxy resin curing agent preferably selected from aliphatic polyamines, aromatic polyamines, aromatic polyamides, alicyclic polyamines, polyamines, polyamides, and amino resins. Most preferably, the epoxy resin curing agent is a 9,9-bis(4-aminophenyl) fluorine, such as 9,9-bis(4 amino-3-chloro-phenyl(fluorine)).

The epoxy resin components may contain up to 33 wt % of the second aromatic epoxy resin component, preferably from 5 to 33 wt % of the second resin component, more preferably from 5 to 30 wt % of the second resin component and most preferably from 10 to 25 wt % of the second aromatic epoxy resin component and/or of the aforesaid ranges.

With different ratios of the secondary-amino groups to primary-amino groups (i.e., where $R^2$ is hydrogen in the curing agent), the characteristics of the cured epoxy resin may be varied. Thus, the glass transition temperature, $T_g$ (both wet and dry) may be increased with an increase in the percentage of bis(primary-aminophenyl) fluorene curing agents and the ductility of the cured resin, as expressed by fracture energy $G_{Ic}$ (measured in accordance with ASTM D5045), is increased by an increase in the percentage of bis(secondary-aminophenyl)fluorene. Furthermore, increased amounts of bis(secondary-aminophenyl)fluorene curative decreases the moisture absorption of the cured epoxy resin.

The use of combinations of fluorene-containing diprimary and disecondary amines is preferred and allows the preparation of a family of cured epoxy resins having a variety of properties. The expected effect is that as crosslinking is increased (greater amounts of primary amine) the glass transition temperature will increase while the ductility of the resin will be decreased. However, with fluorene-containing curatives even samples cured with only disecondary amines still have high glass transition temperatures. The di-primary amines, preferably fluorene-containing di-primary amines, may be added to tailor resin properties for specific applications. In addition to increasing the glass transition temperature, properties such as solvent resistance and creep will be enhanced by increasing the level of primary amine. Even though the resistance to fracture may be decreased, the fracture energy of specimens prepared with fluorene-containing di-primary amines is higher than most conventional cured epoxies. Also the moisture resistance is higher than epoxies prepared with other primary amine curatives. The addition of increasing amounts of the fluorene-containing epoxy resin has the effect of increasing the glass transition temperatures of cured specimens, while not detracting from resistance to fracture or other desirable properties.

The stoichiometric ratio of fluorene to aromatic polyepoxide can also be used to control the crosslink density of the cured epoxy composition. Resins having reduced crosslink density are desirable because they are exceptionally ductile and can be rubber toughened by the addition of a rubbery heterophase (which is described below). Recently we have found that this effect can also be achieved by using a stoichiometric excess of a hindered fluorene-containing di-primary amine. Apparently the di-primary amine is incorporated into the network sequentially. The first NH of the primary amine is significantly more reactive than the second NH. The consequence of this is that when these amines are used to cure an epoxy resin the reaction of the first NH occurs rapidly resulting in a linear structure having the remaining primary amine NH reoccurring along the polymer backbone. The remaining NH groups then react to form a tightly cross-linked network if the stoichiometric ratio of NH to epoxy is nearly equivalent. However, if the ratio of NH to oxirane becomes greater than 1 the crosslink density becomes proportionally reduced. Essentially, NH groups are left along the polymer backbone with nothing left to react with. This essentially has the same effect as using a mixture of primary and secondary amine curing agents. Many useful formulations using this overcharge principle may have a ratio of amino groups to oxirane as high as 1.5.

The process aspect of the invention comprises the steps of (1) mixing the aromatic polyepoxides and the curing agent or agents and catalysts as described below to form a substantially uniform mixture and (2) heating the mixture for a time and at a temperature sufficient to cure the composition. While the curing reaction may take place slowly at room temperature, it preferably is brought about by heating the mixture at 120° C. to about 250° C. for a period of time from about one to about 18 hours or more. It is desirable to bring about cure by heating the mixture in cycles such as, for example, 120° C. to 150° C. for 5 to 18 hours, 150° to 200° C. for 2 to 10 hours, and 175° to 250° C. for 1.0 to 5.0 hours.

The composition of the invention may comprise flame retardants such as phosphorous based components. The phosphorous based components may be in the form of additives or they may be integrated with the curative or epoxy resins. Phosphorous may be incorporated in the backbone of the epoxy resin or curative. Suitable flame retardant curatives may comprise bis(4-nitrophenyl)methylphosphonate, bis(4-aminophenyl)methylphosphonate, bis(3-aminophenyl)methylphosphine oxide, and bis(4-aminophenyl)methylphosphine oxide. Suitable flame retardant epoxy resins may comprise triglycidylphosphite, tryglycidylphosphate, diglycidylalkylphosphonates such as diglycidylmethylphosphonate, and diglycidylphenylphosphonate, or other phosphorous containing epoxy compounds.

Commercially available flame retardants may comprise Polydis as supplied by Struktol, or Exolit EP150, Exolit EP200 as supplied by Clariant.

In a preferred embodiment, the resin composition is suitable as a resin transfer moulding (RTM) resin composition. The resin composition may be heated to a temperature ranging from 20 to 90° C., preferably from 50 to 90° C., more preferably from 50 to 85° C., and most preferably from 60 to 80° C. and/or combinations of the aforesaid ranges prior to infusing a lay-up to reduce the viscosity of the resin composition.

EXAMPLES

The invention will now be further clarified by way of example only with reference to the below Examples 1 to 4.

Example 1

A core shell rubber composition MX136 as supplied by KaneAce was provided. This composition contained a bisphenol F epoxy resin of 220 epoxy equivalent weight (EEW) and a dispersion of 25 weight % of a core shell rubber particle.

A mixture was prepared from 70 g of MX136 in combination with 45 g of Araldite bisphenol F epoxy resin GY285. The mixture was prepared in a mixing vessel and heated to 80° C. 67 g of a curative powder 9,9-bis(4-amino-3-chlorophenyl)-fluorene (CAF) was then added and mixed until it was dispersed. The CAF was supplied by TCI Europe NV. A vacuum pressure was then applied to degas the resin mixture. This mixed resin was used to prepare a composite laminate by a resin transfer moulding (RTM) process of a lay-up of 12 plies of G0926 D E01 carbon fabric. This is a 5 harness woven carbon fabric of a weight of 370 g/m² and containing 6K tows. This fabric was supplied by Hexcel.

The resin mixture was injected from a resin pot at 80° C., into a closed mould containing the 12 plies of G0926 carbon fabric with layup [(+/−45)(0/90)]3s. The mould was held in a heated press at 150-160° C. during the injection process, then subsequently heated to 190° C. for a period of 2 hours to cure the lay up and form the laminate. After cure, the laminate was removed from the press and allowed to cool to room temperature. The resulting laminate had a fibre volume of 58% as measured in accordance with ASTM D3171.

The laminate was tested to determine the wet glass transition temperature (Tg) by dynamic mechanical analysis (DMA) in accordance with standard EN6032 after conditioning the samples for 14 days in 70° C. water. The compression after impact (CAI) of the laminate was determined at 25 J impact energy according to standard EN6038.

Examples 2-4

Using the same process as for Example 1, resins were prepared from the same components but in addition, different amounts of a naphthalene epoxy resin MY816 as supplied by Huntsman (diglycidyl ether of 1.6 dihydroxy naphthalene) were added to the resin formulation in the amounts shown as follows:

TABLE 1

Composition of resins

| Component | Example 1 | Example 2 | Example 3 | Example 4 |
|---|---|---|---|---|
| MX136 | 70 | 70 | 70 | 70 |
| GY285 | 45 | 17 | 16 | 3 |
| CAF | 67 | 66 | 70 | 68 |
| MY816 | 0 | 23 | 29 | 37 |
| wt % naphthalene epoxy resin of total epoxy resin | 0 | 25 | 30 | 40 |

Laminates were prepared by RTM in the same way as in Example 1, and they were tested in the same way using the above described standard tests for measuring $T_g$ and CAI.

TABLE 2

Test results

| Test | Example 1 | Example 2 | Example 3 | Example 4 |
|---|---|---|---|---|
| Wet Tg (14 days @ 70° C.) (° C.) | 137 | 153 | 154 | 159 |
| CAI (25J) (MPa) | 284 | 281 | 264 | 246 |
| wt % naphthalene epoxy resin of total epoxy resin | 0 | 25 | 30 | 40 |

The invention claimed is:

1. An uncured composite material consisting of:
    A) a fibrous reinforcement comprising carbon fibers;
    B) an uncured resin composition consisting of:
        1) an uncured resin component consisting of diglycidyl ether of Bisphenol F and from 19 to 32 weight percent diglycidyl ether of 1,6-dihydroxynaphthalene, based on the total weight of said uncured resin component;
        2) core shell rubber particles dispersed in said uncured resin component; and
        3) a curing agent consisting of 9,9-bis(4-amino-3-chloro-phenyl) fluorene.

2. An uncured composite material according to claim 1 wherein the amount of core shell particles present in said resin composition is from 15 to 16 weight percent, based on the total combined weight of said uncured resin component and said core shell particles.

3. An uncured composite material according to claim 2 wherein the amount of core shell particles present in said resin composition is 16 weight percent, based on the total combined weight of said uncured resin component and said core shell particles.

4. An uncured composite material according to claim 3 wherein the amount of diglycidyl ether of 1,6-dihydroxynaphthalene in said uncured resin composition is 25 weight percent, based on the total weight of said uncured resin component.

5. An uncured composite material according to claim 1 wherein the amount of diglycidyl ether of 1,6-dihydroxynaphthalene in said uncured resin composition is 25 weight percent, based on the total weight of said uncured resin component.

6. A composite part comprising an uncured composite material according to claim 1 that has been cured to form said composite part.

* * * * *